US011899849B1

(12) United States Patent
Shayani et al.

(10) Patent No.: US 11,899,849 B1
(45) Date of Patent: Feb. 13, 2024

(54) COMPUTER KEYBOARD WITH A DISPLAY

(71) Applicant: FINALMOUSE LLC, Venice, CA (US)

(72) Inventors: Ashkon Shayani, New Albany, OH (US); Daniel James Blase, Everett, WA (US); Nathaniel M Henderson-Cox, Seattle, WA (US); Zachary Edwin Eveland, Tacoma, WA (US)

(73) Assignee: Finalmouse LLC, Venice, CA (US)

( * ) Notice: Subject to any disclaimer, the term of this patent is extended or adjusted under 35 U.S.C. 154(b) by 0 days.

(21) Appl. No.: 18/118,655

(22) Filed: Mar. 7, 2023

Related U.S. Application Data

(60) Provisional application No. 63/421,967, filed on Nov. 2, 2022.

(51) Int. Cl.
G06F 3/02 (2006.01)
(52) U.S. Cl.
CPC .................................. G06F 3/021 (2013.01)
(58) Field of Classification Search
CPC ..................................................... G06F 3/021
See application file for complete search history.

(56) References Cited

U.S. PATENT DOCUMENTS

| 3,691,555 | A | | 9/1972 | Looschen |
| 4,244,040 | A | | 1/1981 | Fondiller et al. |
| 5,697,718 | A | * | 12/1997 | Erler ...................... G06F 1/169 |
| | | | | 361/679.09 |
| 2002/0109965 | A1 | | 8/2002 | Horiki |
| 2005/0125570 | A1 | | 6/2005 | Olodort et al. |
| 2012/0068934 | A1 | | 3/2012 | Larsen |
| 2012/0263513 | A1 | | 10/2012 | Larsen |
| 2014/0203953 | A1 | * | 7/2014 | Moser ................. G06F 3/04886 |
| | | | | 341/27 |
| 2015/0061901 | A1 | | 3/2015 | Casparian et al. |
| 2017/0148594 | A1 | | 5/2017 | Feng |
| 2017/0351341 | A1 | * | 12/2017 | Norwalk ................ G06F 3/038 |
| 2018/0217668 | A1 | | 8/2018 | Ligtenberg et al. |
| 2019/0341204 | A1 | | 11/2019 | Sun |
| 2021/0183594 | A1 | | 6/2021 | Lin |
| 2022/0019307 | A1 | * | 1/2022 | Morioka ................ H03K 17/96 |

(Continued)

FOREIGN PATENT DOCUMENTS

| CN | 204011192 | 12/2014 |
| CN | 205211636 | 5/2016 |

(Continued)

OTHER PUBLICATIONS

Absolute Electronics Services, "What is the Standard PCB Thickness," Mar. 28, 2021, retrieved from URL <https://absolutepcbassembly.com/standard-pdb-thickness/>, 7 pages.

(Continued)

Primary Examiner — Amit Chatly
(74) Attorney, Agent, or Firm — Fish & Richardson P.C.

(57) ABSTRACT

A keyboard includes a display including a visual side configured to present content and a substantially transparent substrate overlaying the visual side of the display. The substrate has a printed circuit. The keyboard includes a substantially transparent spacer positioned between the display and the substrate, and keyboard switches mounted to the printed circuit.

23 Claims, 13 Drawing Sheets

(56) References Cited

U.S. PATENT DOCUMENTS

| | | | |
|---|---|---|---|
| 2022/0277910 | A1 | 9/2022 | Lin et al. |
| 2023/0084154 | A1 | 3/2023 | Shayani |

FOREIGN PATENT DOCUMENTS

| | | |
|---|---|---|
| CN | 205563474 | 9/2016 |
| CN | 107564754 | 1/2018 |
| CN | 210091139 | 2/2020 |
| CN | 214152764 | 9/2021 |
| FR | 2503493 | 10/1982 |
| JP | 08171441 | 7/1996 |
| JP | 2009176245 A | 8/2009 |
| JP | 2013229055 | 11/2013 |
| KR | 20170035075 | 3/2017 |

OTHER PUBLICATIONS amazon.com [online], "Logitech G19 Programmable Gaming Keyboard with Color Display," available on or before May 7, 2010, retrieved on Sep. 13, 2021, retrieved from URL <https://www.amazon.com/Logitech-Programmable-Gaming-Keyboard-Display/dp/B001NXDBI6>, 10 pages.

apple.com [online], "Customize your 13-inch MacBook Pro—Space Gray," available on or before Nov. 11, 2020, retrieved on Sep. 13, 2021, retrieved from URL <https://www.apple.com/shop/buy-mac/macbook-pro/13-inch-space-gray- apple-m1-chip-with-8-core-cpu-and-8-core-gpu-256gb>, 4 pages.

asus.com [online], "ASUS Zenbook 14X OLED, A vision of brilliance," retrieved on Sep. 13, 2021, retrieved from URL <https://www.asus.com/us/Laptops/For-Home/Zenbook/Zenbook-14X-OLED-UX5400-11th-Gen-Intel/>, 27 pages.

deskthority.net [online], "Hot-swap—Deskthority wiki", dated Jun. 30, 2021, retrieved on May 11, 2022, retrieved from URL<https://deskthority.net/wiki/index.php?title=Hot-swap&oldid=48850>, 3 pages.

EP Extended Search Report in European Application No. 21218367.7, dated May 20, 2022, 10 pages.

International Search Report and Written Opinion in International Application No. PCT/US2022/040770, dated Nov. 25, 2022, 17 pages.

kailhswitch.com [online], "kailh socket switch for kailh traditional switch and choc switch—Knowledge—Dongguan City Kaihua Electronics Co.,Ltd," dated on Nov. 4, 2019, retrieved May 11, 2022, retrieved from URL<https://www.kailhswitch.com/info/kailh-socket-switch-for-kailh-traditional- swit-40321136.html>, 4 pages.

Merriam-Webster, "Case," 2022, retrieved from URL <https://www.merriam-webster.com/dictionary/case> 14 pages.

razer.com [online], "Razer DeathStalker Ultimate—Smart Gaming Keyboard," available on or before Aug. 5, 2020, retrieved on Sep. 13, 2021, retrieved from URL <https://www2.razer.com/au-en/gaming-keyboards-keypads/razer-deathstalker-ultimate>, 10 pages.

steelseries.com [online], "APEX 7," available on or before Jul. 23, 2019, retrieved on Sep. 13, 2021, retrieved from URL <https://steelseries.com/gaming-keyboards/apex-7>, 12 pages.

switchandclick.com, "Plate Mounted VS PCB Mounted Switches—Switch and Click" dated Apr. 21, 2021, retrieved on May 11, 2022, retrieved from URL<https://web.archive.org/web/20210421212224/https://switchandclick.com/plate-mounted-vs-pcb-mounted-keyboard/>, 19 pages.

switchandclick.com, "Plate Mounted VS PCB Mounted Switches", Apr. 21, 2021, retrieved from URL<https://web.archive.org/web/20210421212224/https://switchandclick.com/plate-mounted-vs-pcb-mounted-keyboard/>, 17 pages.

Dave Johnson, "Mechanical keyboard switches: A guide to the different switch options for mechanical keyboards and their uses," Dec. 23, 2020, Business Insider, https://www.businessinsider.com/guides/tech/mechanical-keyboard-switches, pp. 5-7.

\* cited by examiner

COMPUTER KEYBOARD WITH A DISPLAY

CROSS-REFERENCE TO RELATED APPLICATION

This application claims priority to U.S. Provisional Application No. 63/421,967, filed on Nov. 2, 2022. The disclosure of the prior application is considered part of and is incorporated by reference in the disclosure of this application.

TECHNICAL FIELD

This specification relates to a computer keyboard with a display.

BACKGROUND

A keyboard includes keys that can be actuated by a user to operate a computing device, e.g., a laptop computer, a desktop computer, or other user computing device. The keyboard can include mechanical switches coupled to keycaps that are pressed by the user. In response to actuation of these switches, the keyboard can provide signals that are used to operate the computing device, e.g., for typing or executing other operations of the computing device.

SUMMARY

This disclosure describes a mechanical keyboard with a display for presenting content to a user through an upper input surface of the keyboard. The keyboard can include internal components that allow the content presented on the display to be visible through the internal components so that the content is visible through the input surface of the keyboard. The keyboard can further include a spacer between the display and upper surface of the keyboard that can help maintain integrity of the image projected through the upper surface of the keyboard.

In one aspect, a keyboard includes a display including a visual side configured to present content and a substantially transparent substrate overlaying the visual side of the display. The substrate has a printed circuit. The keyboard includes a substantially transparent spacer positioned between the display and the substrate, and keyboard switches mounted to the printed circuit.

In some implementations, the keyboard further includes a gasket extending along a perimeter of the spacer. In some implementations, the gasket extends along an entire perimeter of the spacer. In some implementations, the gasket includes an inwardly facing slot within which the perimeter of the spacer is received. In some implementations, a perimeter of the display is received in the slot of the gasket. In some implementations, a perimeter of the substrate is received in the slot of the gasket. In some implementations, an outer perimeter of the gasket has a substantially rectangular shape. In some implementations, an upper surface of the gasket is positioned above an upper surface of the substrate. In some implementations, the keyboard further includes an outer case within which the display, the substrate, and the spacer are housed. The gasket can be engaged with the outer case. In some implementations, a first surface of the spacer is adhered to the substrate, and a second surface of the substrate is adhered to the display. The gasket can be engaged with the outer case to attach the display, the spacer, and the substrate to the outer case.

In some implementations, the spacer includes a first surface facing the display and a second surface facing the substrate, and wherein the first and second surfaces are substantially planar.

In some implementations, the spacer includes a first surface facing the display and a second surface facing the substrate, and the spacer includes a plurality of cavities into which portions of the keyboard switches protrude. In some implementations, a depth of a cavity of the plurality of cavities is between 0.5 and 3 millimeters. In some implementations, the keyboard switches are mounted to a surface of the substrate facing away from the spacer. In some implementations, a cavity of the plurality of cavities is a through opening extending through the spacer.

In some implementations, a thickness of the spacer is between 0.75 and 5 millimeters.

In some implementations, the keyboard further includes a first laminate attaching the spacer to the visual side of the display. In some implementations, the keyboard further includes a second laminate attaching the spacer to the substrate.

In some implementations, the spacer is formed of a transparent material.

In some implementations, the keyboard switches are mechanical keyboard switches.

In some implementations, the keyboard further includes keycaps operably engaged with the keyboard switches.

In some implementations, the display is configured to present the content on the visual side of the display such that at least some of the content is visible through the spacer and through the substrate.

In some implementations, the keyboard includes keys protruding from an upper surface of the keyboard. In some implementations, the keys includes the keyboard switches. In some implementations, the printed circuit is electrically coupled to the switches of the keys. In some implementations, the printed circuit is configured to generate signals responsive to operation of the switches of the keys. In some implementations, the display is positioned below the upper surface of the keyboard. In some implementations, the visual side faces the upper surface of the keyboard.

In some implementations, the printed circuit can be positioned between the keys and the display. In some implementations, the printed circuit can be positioned on a substrate to which the switches are mounted. In some implementations, the substrate can be substantially transparent. The content or the at least some of the content presented by the display can be visible through the substrate and through the upper surface of the keyboard. In some implementations, the substrate can include glass. In some implementations, the printed circuit can be positioned on a lower surface of the substrate. Terminals of the switches can extend through at least a portion of the substrate. In some implementations, one or more adapters can be surface mounted to the lower surface of the substrate to electrically couple the one or more adapters to the printed circuit. The terminals of the switches can extend through at least the portion of the substrate to electrically couple with the one or more adapters.

In some implementations, the display can be a substantially flat display.

In some implementations, the display can be a light-emitting diode display or a liquid-crystal display.

In some implementations, the keys can be sized such that at most 80% of a total area of the visual side of the display is covered by the keys.

In some implementations, the keys can be sized such that at least 20% of a total area of the visual side of the display is visible through the upper surface of the keyboard.

In some implementations, the keyboard can further include a substantially transparent case housing the printed circuit and the display. The substantially transparent case can define the upper surface of the keyboard.

In some implementations, a width of the display can be between 50 and 400 millimeters. A length of the display can be between 100 and 600 millimeters wide. A thickness of the display can be between 1 and 20 millimeters.

In some implementations, the substrate can be made of glass.

In some implementations, a thickness of the substrate can be between 1 and 20 millimeters.

In some implementations, areas of the substrate that are not covered by the printed circuit can be substantially transparent.

In some implementations, the keys can include switches and the printed circuit can include hot swappable sockets for mounting the switches. In some implementations, terminals of the switches are coupled to the hot swappable sockets.

In some implementations, the substrate can have tension holes to secure the switches.

Advantages of implementations of the systems and methods described in this disclosure may include those described below and elsewhere in this disclosure.

A keyboard in accordance with implementations described in this disclosure can be more aesthetically appealing. For example, the display of the keyboard can provide content, e.g., imagery and/or videos, that improve the functioning of the keyboard and visual engagement with the keyboard. Further, the components of the keyboard can allow the content provided by the display to be more easily visible from the perspective of a user using the keyboard, e.g., when the keyboard is viewed from above. The display can be visible through the components of the keyboard.

A keyboard in accordance with implementations described in this disclosure can provide information to a user by presenting content to the user through the display. The content provided by the display of the keyboard can, for example, be coordinated with information presented on a display of a computing device for which the keyboard serves as a user input device, or can present other useful information for the user (e.g., a time, a battery life, or other information).

A keyboard in accordance with implementations described in this disclosure can provide a user experience engaging tactile, auditory, and visual senses of a user. In particular, the keyboard can use mechanical switches that provide mechanically generated tactile and auditory feedback to the user as the user presses a particular key, especially compared to a digital keyboard that relies on one or more vibration units of a mobile computing device to provide tactile feedback as a user operates a digital key. Furthermore, the display of the keyboard further allows the keyboard to provide content that is visible through or around the mechanical keys of the keyboard, thus allowing the keyboard another modality of stimulating the senses of the user as the user operates the keyboard.

A keyboard in accordance with implementations described in this disclosure can improve the quality of the image visible to the user using the keyboard. The components of the keyboard can be stacked and attached to one another in a manner that reduces optical aberrations of the image that is seen by the user.

The details of one or more implementations of the subject matter described in this specification are set forth in the accompanying drawings and the description below. Other potential features, aspects, and advantages will become apparent from the description, the drawings, and the claims.

DETAILED DESCRIPTION

Figure 1:
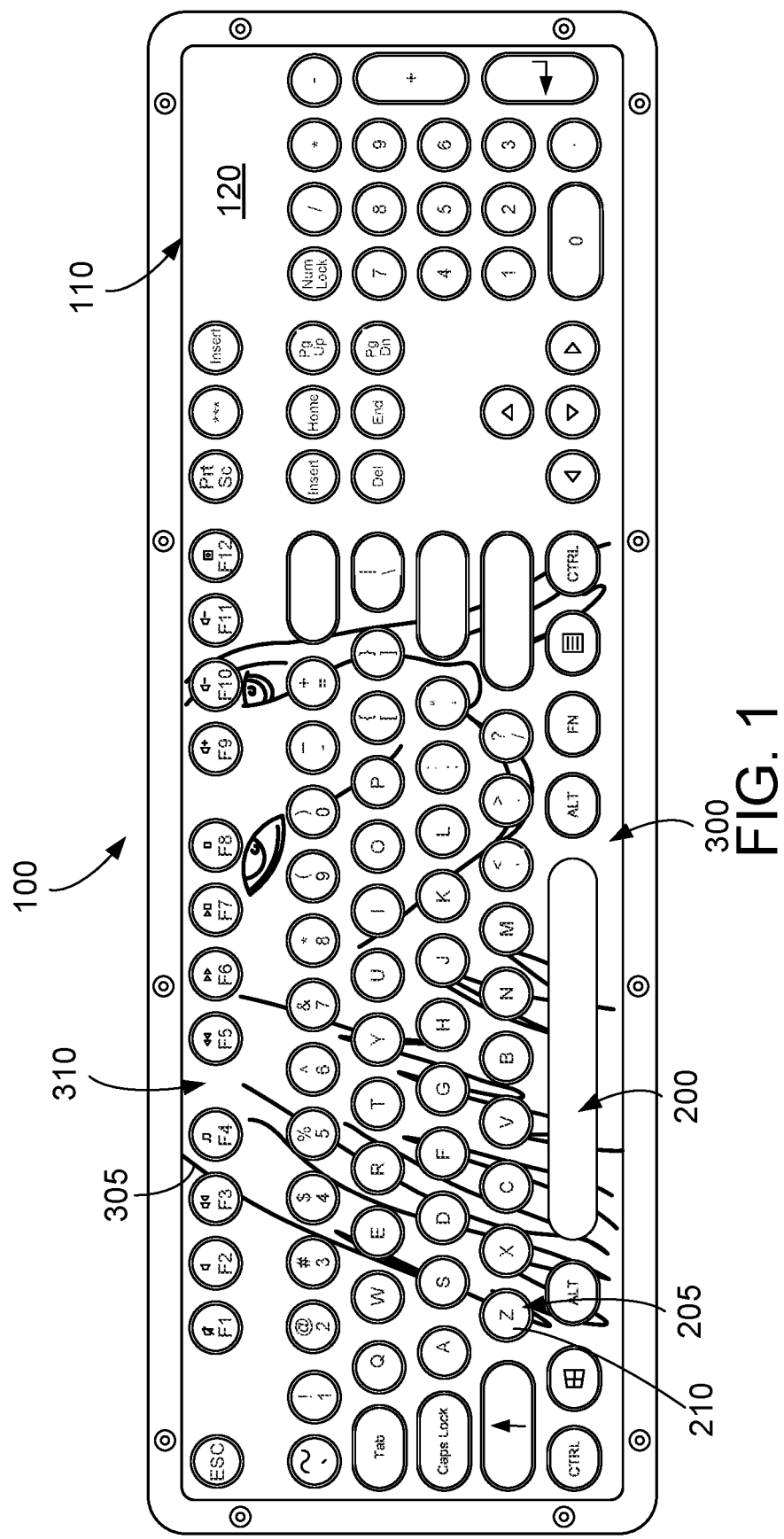
FIG. 1 is a top view of an example of a keyboard including a display.

Referring to FIG. 1, an example of a keyboard 100 includes a mechanical user input system 200 and a display 300 including a visual side 310 that is visible to a user during use of the keyboard 100. The mechanical user input system 200, e.g., including keys (e.g., a key 205), can include one or more mechanical components that, when actuated by a user, generate a signal to control a user computing device operably connected to the keyboard 100. The display 300 can present content 305 on the visual side 310, and the visual side 310 can face the mechanical user input system 200. For example, the user-operable portions of the mechanical user input system 200 can be positioned on an upper portion 110 of the keyboard 100, and the content presented on the visual side 310 of the display 300 can be visible on or through the upper portion 110 of the keyboard 100. The content presented on the visual side 310 can be visible through one or more components of the keyboard 100, thereby allowing the content to be visible through the upper portion 110 of the keyboard 100. As discussed in this disclosure, implementations of keyboards including displays can provide an appealing, improved typing experience that provides mechanical feedback (e.g., from the sound of the keys when the keys are actuated by the user) while also allowing the user to view visual content through the keyboard during use of the keyboard.

FIG. 1 illustrates an example of the keyboard 100. The keyboard 100 includes the mechanical user input system 200 and the display 300. The keyboard 100 can be operably connected to a user computing device, e.g., via a wired connection or a wireless connection, thereby allowing the keyboard 100 to generate signals for controlling the user computing device. The keyboard 100 generates the signals in response to operation of the mechanical user input system 200, thus allowing a user to type text or otherwise operate the mechanical user input system 200 in defined ways to control the user computing device.

The mechanical user input system 200 includes the keys (e.g., the key 205). Each of the keys includes a user-operable portion, e.g., a keycap, that a user presses with a finger in order to actuate the key. For example, a user-operable portion 210 of the key 205 includes an upward facing surface that the finger of the user engages with and pushes to actuate the key. The user-operable portion 210 extends upwardly from an upper surface 120 (e.g., an input surface of the keyboard 100) on the upper portion 110 of the keyboard 100, thus allowing a user to easily access and depress the key 205.

Figure 2:
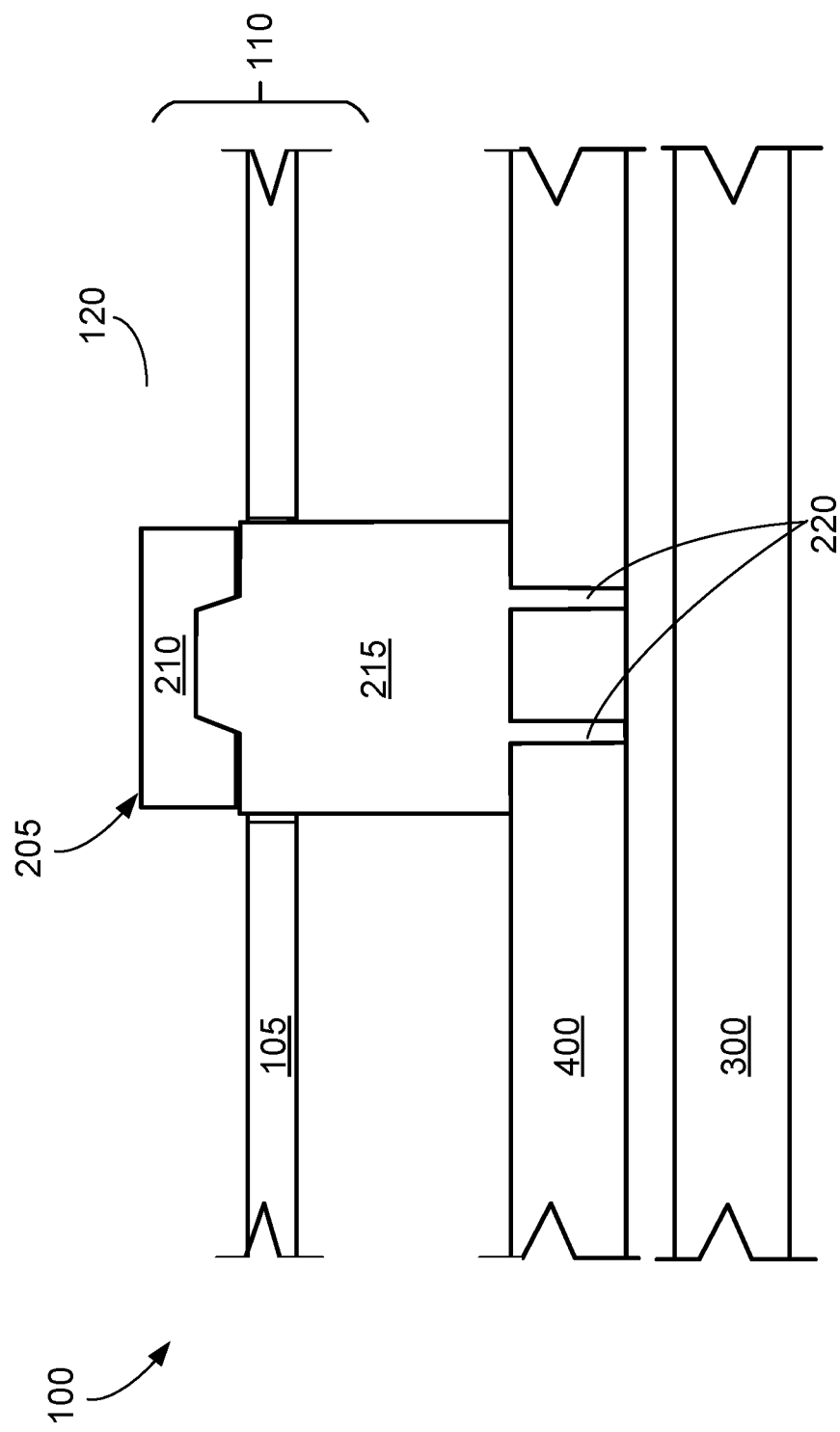
FIG. 2 is a schematic side cross-sectional view of a key of the keyboard of FIG. 1.

Referring briefly to FIG. 2, which shows a schematic cross-sectional side view of the keyboard 100 along a vertical plane through the key 205, the key 205 further includes a mechanical switch 215, e.g., a spring-loaded mechanical switch. The key 205 and its mechanical switch 215 can provide tactile feedback to the user as the user actuates the key 205, e.g., as the mechanical switch 215 returns to its neutral position. The key 205 is positioned on the upper portion 110 of the keyboard 100. As shown in FIG. 2, a case 105 of the keyboard 100 defines the upper surface 120 of the keyboard 100. The key 205, in particular, the user-operable portion 210 of the key 205, protrudes from the upper surface of the keyboard 100. The user-operable portion 210 is mechanically coupled to the switch 215 such that depression of the user-operable portion 210 causes the switch 215 to be actuated. The switch 215 in turn is mechanically connected to a substrate 400 positioned within the case 105 of the keyboard 100. The substrate 400 is positioned below the upper surface 120 of the case 105. As shown in FIG. 2, the substrate 400 is spaced apart from the display 300. Further, the substrate 400 includes an electrical circuit (not shown) that is electrically connected to the switch 215 such that operation of the switch 215 generates an electrical signal that can be used to control the user computing device to which the keyboard 100 is operably connected. The switch 215 can be surface-mounted to the electrical circuit, e.g., either directly or indirectly through an adapter, as discussed in this disclosure. For example, the switch 215 of the key 205 can have terminals 220 that are mounted to the substrate 400 via an adapter that is surface-mounted to the substrate 400.

The case 105 mechanically houses components of the keyboard 100. For example, the case 105 houses at least a portion of each of the keys, e.g., the mechanical switches of the keys, the substrate 400, and the display 300. In some implementations, the case 105 defines the bottom portion of the keyboard 100 to allow the case 105 and hence the keyboard 100 to rest on a surface, such as a desk or a table.

Also shown in FIG. 2 is the display 300. The display 300 is positioned below the substrate 400 and below the mechanical user input system 200, including the key 205. The visual side 310 faces the substrate 400 and the mechanical user input system 200. Further, the content presented on the visual side 310 can be visible through the substrate 400 and through the upper surface 120 of the keyboard 100. For example, the substrate 400 and the upper surface 120 can be substantially transparent, e.g., have transmittances of, for example, at least 50%, at least 60%, at least 70%, at least 80%, or at least 90%. For the substrate 400, at least the areas of the substrate 400 that are not covered by the electrical circuit (e.g., the printed circuit) are substantially transparent. In some implementations, the case 105 in its entirety is substantially transparent. Because the case 105 and the substrate 400 are substantially transparent, the content presented by the display 300 can be at least partially visible through the substrate 400 and through the upper surface 120 of the keyboard 100.

The display 300 and, in particular, the visual side 310 of the display 300, can be substantially flat. In some implementations, the display 300 is a light-emitting diode (LED) display (e.g., an organic LED (OLED) display, an active-matrix OLED (AMOLED) display, or other appropriate LED display), a liquid-crystal display (LCD), or other appropriate display. The display 300 has a pixel density of, for example, at least 5, 10, 15, 20, 25, 30, 35, 40, 45, 50, 60, 70, 80, 90, 100, 125, 150, 175, 200, 250, or 300 pixels per centimeter (ppcm).

The substrate 400, as discussed in greater detail in this disclosure, can be formed of a glass material. Furthermore, an electrical circuit can be printed on the substrate 400. The substrate 400 is positioned above the display 300 and below the mechanical user input system 200. In implementations, the electrical circuit can be positioned on the upper surface of the substrate 400 or on the lower surface of the substrate 400. To electrically connect a component to the electrical circuit on the substrate 400, the component can be surface mounted to the substrate 400, thereby creating an electrical connection with the component.

The substrate 400 can also provide mechanical support for components of the keyboard 100. For example, components of the mechanical user input system 200 can be mechanically mounted to the keyboard 100 via a fastener, such as a screw or adhesive. The keys of the mechanical user input system 200 can be mounted to the substrate 400. For example, bases of mechanical switches of the keys can be mechanically mounted to the substrate 400.

The keyboard 100 can have overall width between 10 centimeters and 16 centimeters, and an overall length between 30 and 60 centimeters. The number of keys on the keyboard 100 can vary between 40 and 150 keys, or more or less. The keycaps of the keys can be substantially transparent in some implementations. In other implementations, the keycaps can be substantially opaque. In implementations, the keycaps can vary in shape and size. For example, the keycaps can be substantially rectangular, substantially square, or substantially circular shaped. The switches of the keys can be substantially opaque. When the keyboard 100 is viewed from above, the area footprint of the keycaps can completely cover the area footprint of the switches. The switches can each have a width and a length that are no more than 20 millimeters (e.g., no more than 17 millimeters, no more than 15 millimeters, no more than 13 millimeters, no more than 12 millimeters, no more than 11 millimeters, between 10 and 20 millimeters, between 5 and 12 millimeters, about 14 millimeters, about 13 millimeters, about 12 millimeters, about 11 millimeters, about 10 millimeters, etc.). A height of the switches can be no more than 20 millimeters (e.g., no more than 19 millimeters, no more than 17 millimeters, no more than 15 millimeters, no more than 12 millimeters, about 12 millimeters, about 15 millimeters, about 17 millimeters, about 19 millimeters, etc.).

The display 300 can have a width between 50 and 400 millimeters (e.g., between 50 and 200 millimeters, between 50 and 250 millimeters, between 50 and 300 millimeters, between 75 and 225 millimeters, between 100 and 200 millimeters, at least 50 millimeters, at least 100 millimeters, about 100 millimeters, about 150 millimeters, about 200 millimeters, etc.), a length between 100 and 600 millimeters (e.g., between 100 and 400 millimeters, between 100 and 500 millimeters, between 150 and 550 millimeters, between 200 and 500 millimeters, between 250 and 450 millimeters, at least 100 millimeters, at least 200 millimeters, at least 300 millimeters, about 200 millimeters, about 250 millimeters, about 300 millimeters, about 350 millimeters, about 400 millimeters, etc.), and a thickness between 1 and 20 millimeters (e.g., between 1 and 15 millimeters, between 1 and 7 millimeters, between 1 and 5 millimeters, between 1 and 3 millimeters, about 3 millimeters, about 5 millimeters, about 7 millimeters, about 10 millimeters, about 15 millimeters, etc.).

An overall surface area of the visual side 310 of the display 300 can be between 50 and 2400 square centimeters (e.g., between 100 and 1000 square centimeters, between 250 and 750 square centimeters, at least 100 square centimeters, at least 200 square centimeters, at least 300 square centimeters, at least 400 square centimeters, about 400 square centimeters, about 500 square centimeters, about 600 square centimeters etc.). The overall footprint area of the keyboard 100 can be between 100 and 3000 square centimeters (e.g., between 200 and 1200 square centimeters, between 400 and 1000 square centimeters, about 600 square centimeters, about 700 square centimeters, about 800 square centimeters, about 900 square centimeters). The visual side 310 of the display 300 can extend across at least 10% of the overall footprint area of the keyboard 100 (e.g., at least 20%, at least 30%, at least 40%, at least 50%, at least 60%, at least 70%, at least 80%, etc., of the overall footprint area of the keyboard 100). The case 105, the keys of the mechanical user input system 200, and the display 300 can be sized such that at most 80% (e.g., at most 70%, at most 60%, at most 50%, at most 40%, at most 30%, at most 20%, etc.) of a total area of the visual side 310 of the display 300 is covered by the keys of the mechanical user input system 200 and such that at least 20% (e.g., at least 30%, at least 40%, at least 50%, at least 60%, at least 70%, or at least 80%) of a total area of the visual side 310 of the display 300 is visible through the upper surface 120 of the keyboard 100.

The content that can be presented using the display 300 can vary in implementations. In some implementations, the display 300 presents imagery (e.g., still images or a video) that is looped to provide an aesthetically appealing background for the keyboard 100. In some implementations, the content provides information that can be useful to a user, e.g., a battery life of the keyboard 100 or the user computing device to which the keyboard 100 is connected, a time, a ping rate, a wireless connection strength, or other information that can be useful to the user in operating the user computing device.

Figure 3:
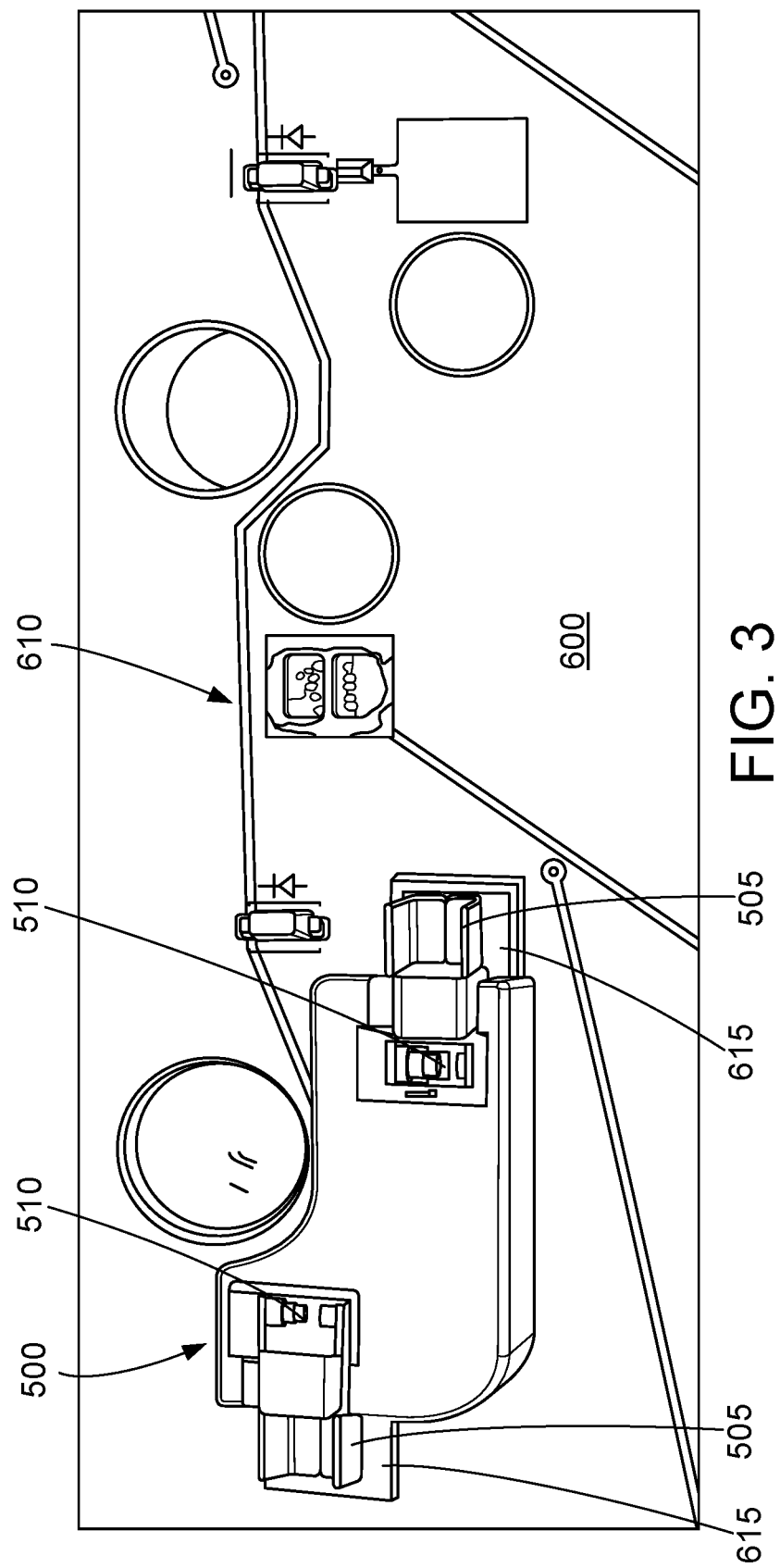
FIG. 3 is a top view of an example of a substrate on which an adapter is surface mounted.
Figure 4A:
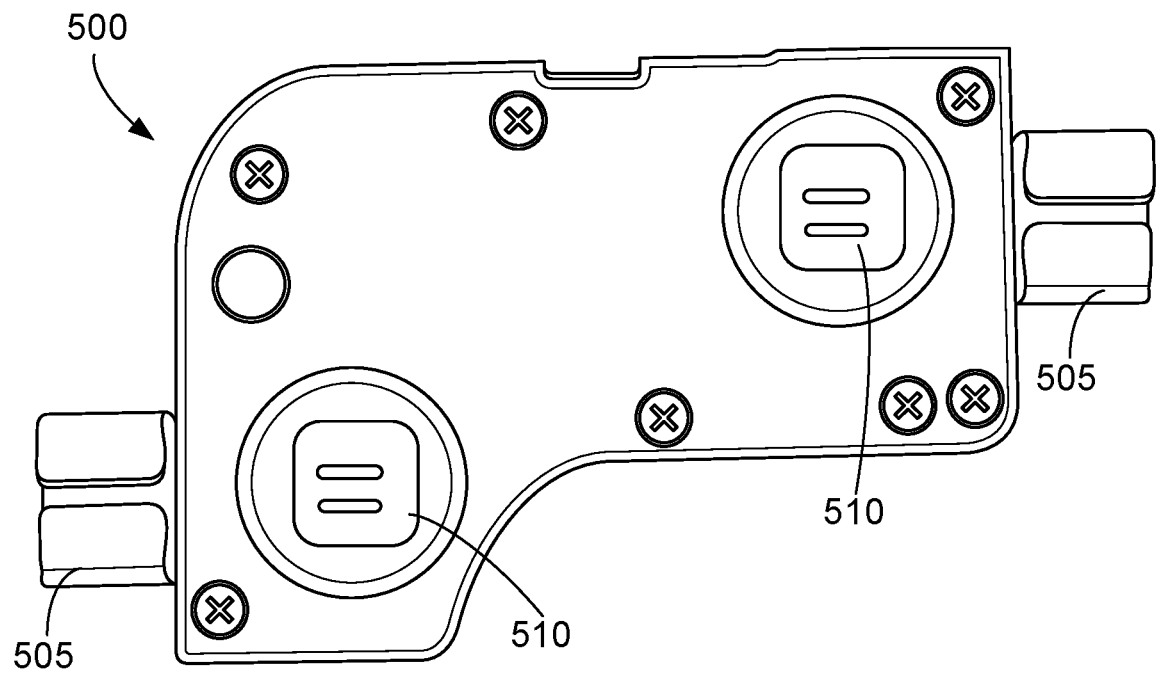
FIGS. 4A-4B are bottom and top views, respectively, of an example of the adapter of FIG. 3.
Figure 4B:
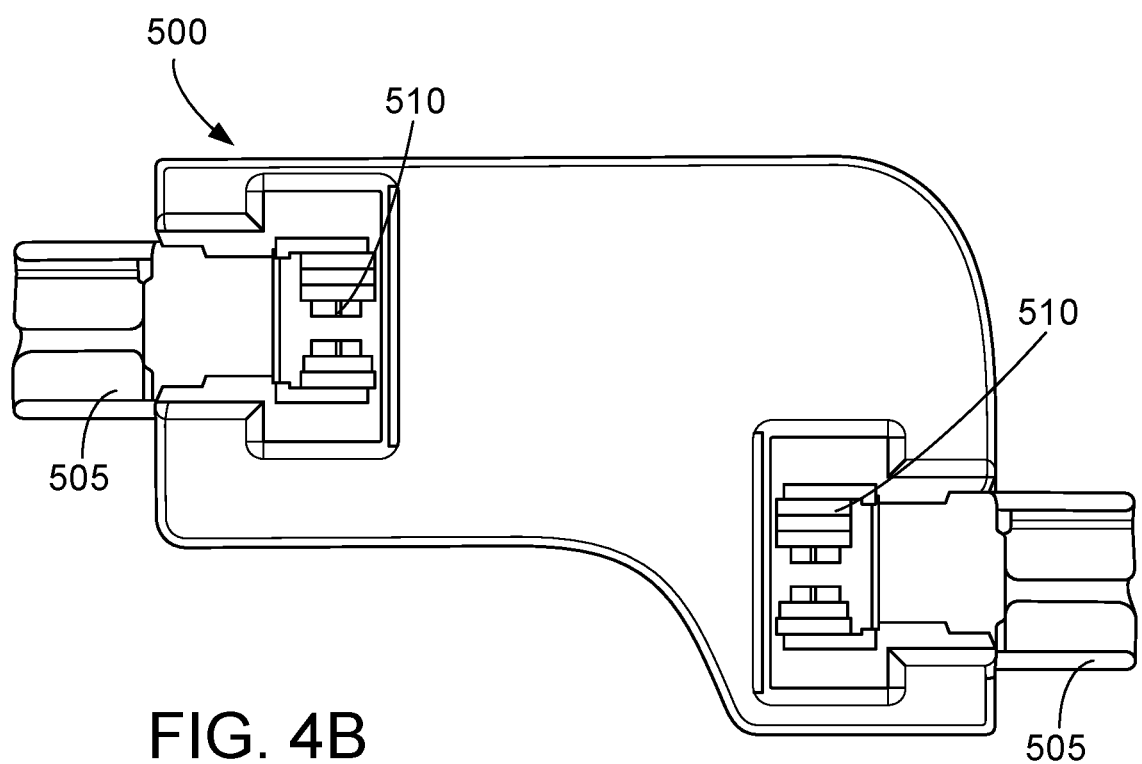

FIGS. 3-4B illustrate an example of surface mounting an adapter 500 to a substrate 600 and an electrical circuit 610 (only a portion of which is shown in FIG. 3) on the substrate 600, e.g., such that keys can be mounted to the adapter 500. The substrate 600, in some implementations, can accommodate both surface mounting and through hole techniques for electrically coupling an electrical component to the electrical circuit 610 on the substrate 600. In some implementations, the substrate 600 can more easily accommodate or can only accommodate surface mounting techniques for electrically coupling an electrical component to the electrical circuit 610. In implementations in which the mechanical switches of the keys of the keyboard have terminals that can only be directly electrically connected to an electrical circuit 610 using through-hole techniques, an adapter similar to the adapter 500 can be used so that the adapter can be surface mounted to the electrical circuit 610 and the terminals of the mechanical switches can be received by the adapter. In this way, no electrical component needs to be directly mounted to the substrate 600 using through-hole techniques.

The adapter 500 is, for example, a hot swappable printed circuit board socket that can be easily surface mounted to the substrate 600, and that can easily electrically couple with terminals of keys (e.g., the terminals 220 of FIG. 2). The substrate 600 can be similar to the substrate 400 described with respect to FIGS. 1-2. The adapter 500 includes mounting terminals 505 that can be surface mounted (e.g., through soldering or other techniques for surface mounting the mounting terminals to the substrate 600) to an electrical circuit 610 (e.g., a printed circuit) on the substrate 600 to electrically couple the adapter 500 to the electrical circuit 610. The mounting terminals 505 can be surface mounted to corresponding pads or contacts 615 that are part of the electrical circuit 610. The adapter 500 further includes receiving sockets 510 to receive terminals of a key switch, e.g., the terminals 220 of FIG. 2.) The terminals of the key switch can be inserted into the receiving sockets 510 to electrically couple the key switch to the adapter 500 and thereby electrically couple the key switch to the electrical circuit 610.

The implementations of keyboards described in this application can be external keyboards that can be operably connected to a user computer device or can be integrated into a laptop computer. In some implementations, referring back to FIG. 1, a keyboard (e.g., the keyboard 100) can be a standalone external keyboard that can be operably connected to a user computing device, e.g., via a wired or wireless connection. In other implementations, a keyboard having features similar to those described with respect to the keyboard 100 of FIG. 1 can be integrated into a user computer device, e.g., a laptop computer.

Figure 5:
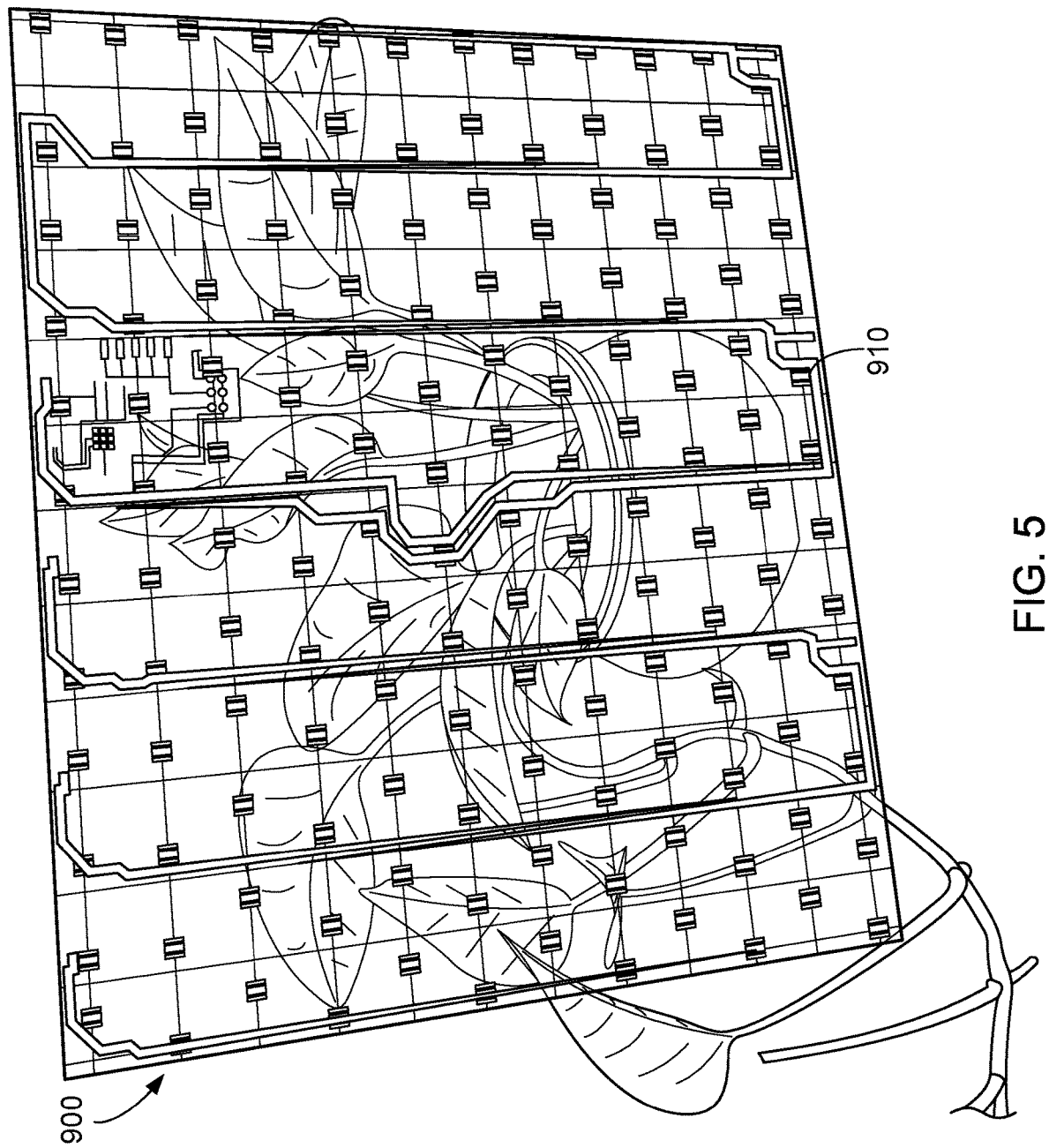
FIG. 5 is an example of a substrate for the keyboard of FIG. 1.

The substrate on which the electrical circuit is positioned can vary in implementations. Referring to FIG. 5, an example of a substrate 900 is shown. The substrate 900 can be substantially transparent, as described in this disclosure. Further, the substrate 900 provides a surface (e.g., a bottom surface or a top surface) that an electrical circuit can be printed on. For example, the substrate 900 can be formed of a glass material (e.g., including sapphire glass, crystal glass, tempered glass, or other glass material that can be transparent and that can provide surface for printing an electrical circuit) or a polymer material (e.g., polycarbonate, acrylic, polyethylene terephthalate, or other appropriate polymer material that can be transparent and that can provide a surface for printing an electrical circuit). A thickness of the substrate 900 can be between 1 and 20 millimeters (e.g., no more than 20 millimeters, no more than 15 millimeters, no more than 10 millimeters, no more than 5 millimeters, between 1 and 10 millimeters, between 1 and 7 millimeters, about 5 millimeters, about 4 millimeters, about 3 millimeters, etc.). An electrical circuit 910 can be directly printed on the substrate 900. As discussed in this disclosure, mechanical switches of a keyboard can surface mounted to the substrate 900, e.g., via an adapter such as the adapter 500 or directly surface mounted to the substrate 900 (as discussed in greater detail with respect to FIG. 9).

Figure 6:
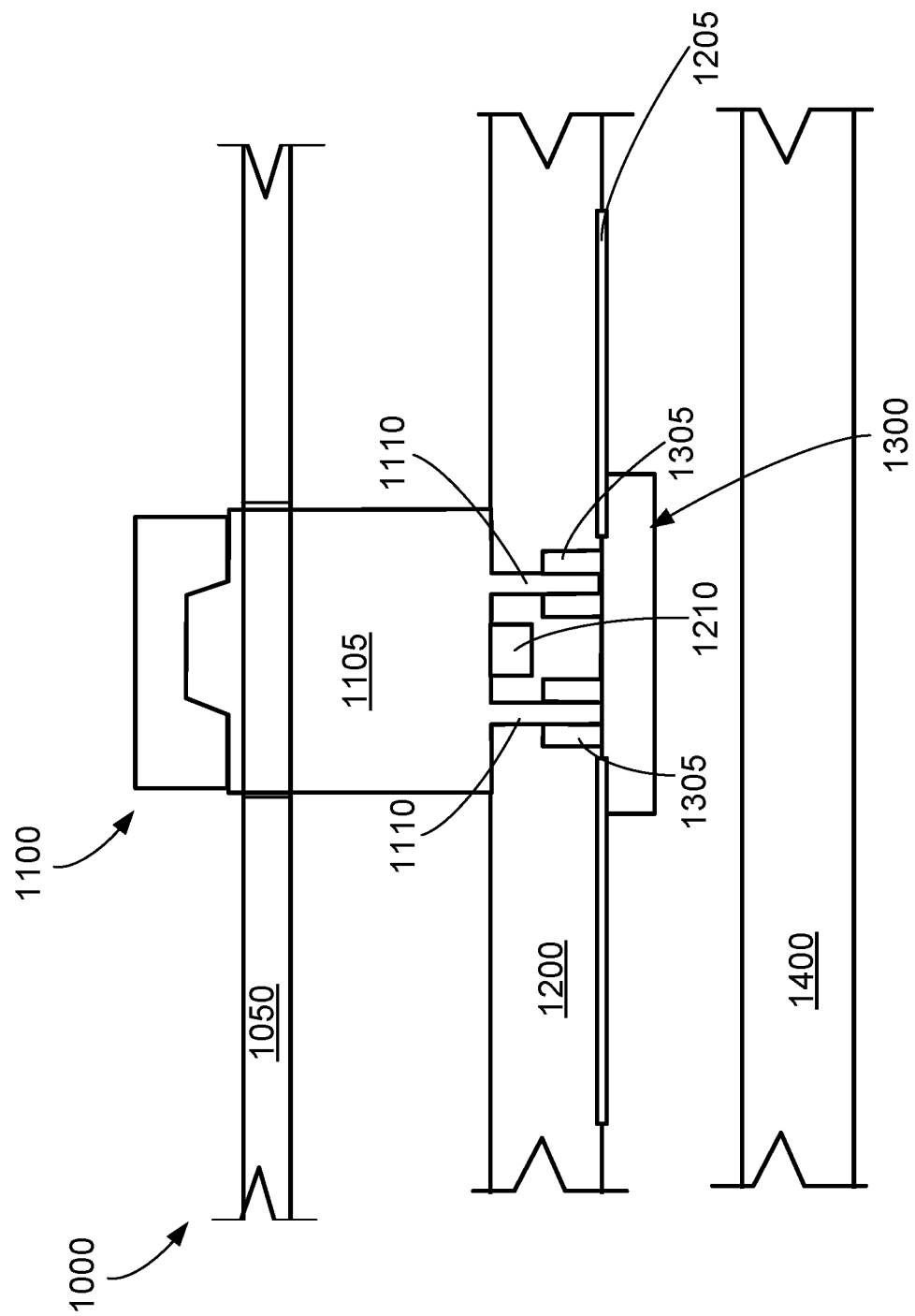
FIG. 6 is a schematic side cross-sectional view of another example of a key of a keyboard.

FIG. 6 illustrates a schematic cross-sectional side view of a keyboard 1000 (e.g., similar to the keyboard 100) along a vertical plane through a key 1100. The key 1100 is similar to the key 205. FIG. 6 illustrates a specific example of mounting a switch 1105 to a substrate 1200 having an electrical circuit 1205. A display 1400 similar to the display 300 is positioned below the substrate 1200. As shown in FIG. 6, the substrate 1200 is spaced apart from the display 1400. A case 1050 is similar to the case 105.

In the example shown in FIG. 6, an electrical circuit 1205 is positioned on a bottom surface of the substrate 1200. For example, the electrical circuit 1205 faces the display 1400. An adapter 1300 is mounted to the bottom surface of the substrate 1200 and is electrically connected to the electrical circuit 1205. Terminals 1110 of the switch 1105 extend through the substrate 1200 and are received by the adapter 1300 (e.g., by receiving sockets similar to the receiving sockets 510). For example, receiving sockets 1305 of the adapter 1300 extend through at least part of the substrate 1200, and the terminals 1110 extend through at least part of the substrate 1200 to be received by the receiving sockets 1305. Holes can be formed through the substrate 1200, and the terminals 1110 of the switch 1105 and the receiving sockets 1305 of the adapter 1300 are insertable into the holes in the substrate 1200. The substrate 1200 can include a tension hole 1210 to which a portion of the switch 1105 of the key 1100 is mechanically attached, e.g., using a fastener such as a screw or adhesive.

Figure 7:
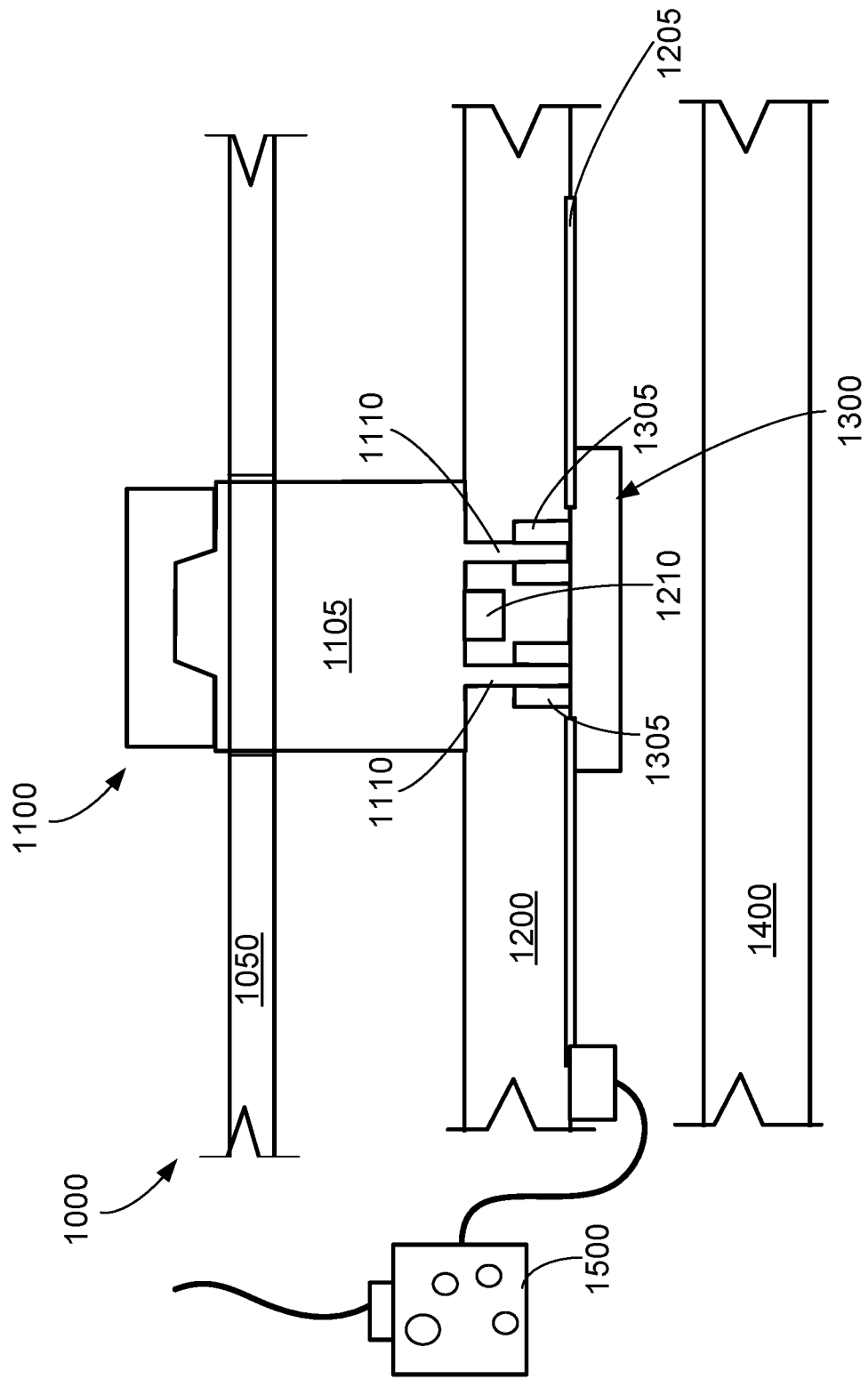
FIG. 7 is a schematic side cross-sectional view of a further example of a key of a keyboard.

In some implementations, as shown in FIG. 7, a daughter board 1500 is connected to the electrical circuit 1205. The display 1400 can be connected to the electrical circuit 1205, and the daughter board 1500 can include one or more processors for controlling the display 1400 and controlling the content that the display 1400 presents.

Figure 8:
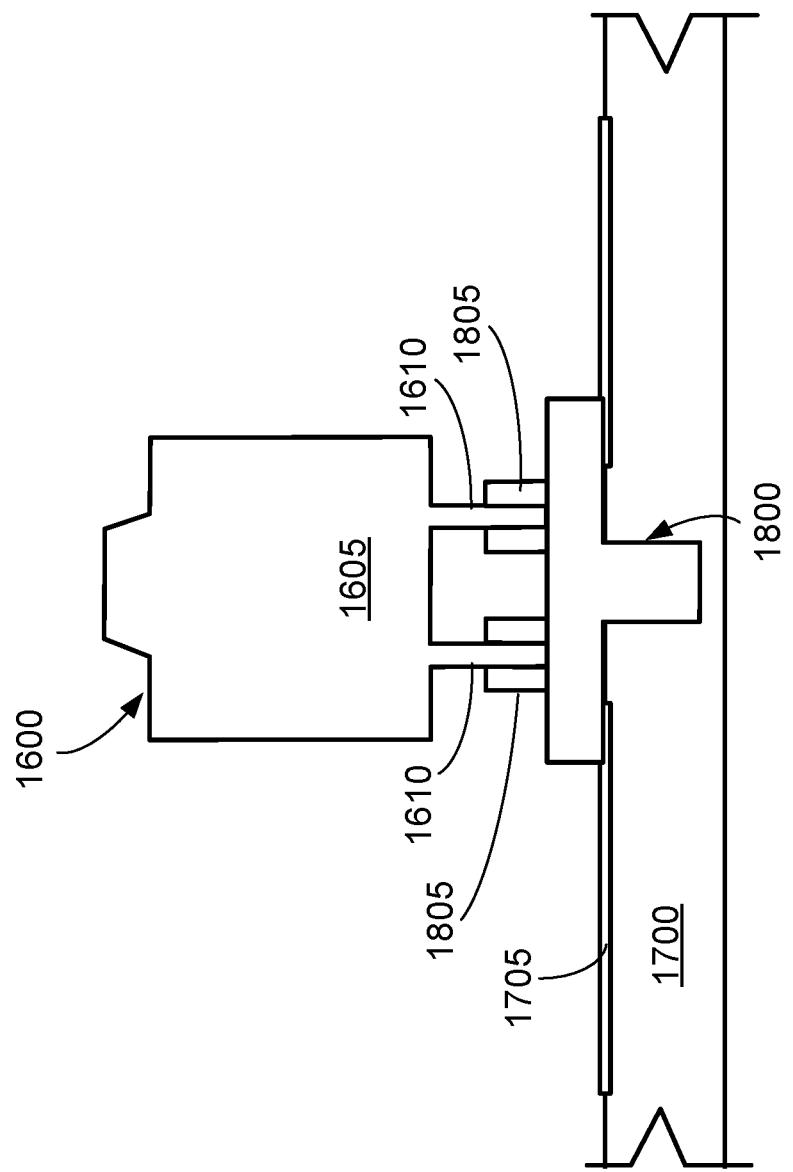
FIG. 8 is a schematic side cross-sectional view of a further example of a key of a keyboard.

FIG. 8 illustrates a schematic cross-sectional side view of a key 1600 mounted to a substrate 1700 (e.g., for the keyboard 100). In the example of FIG. 8, an electrical circuit 1705 of the substrate 1700 is on a top surface of the substrate 1700. A switch 1605 of the key 1600 is mounted to an adapter 1800 that is in turn surface mounted to the top surface of the substrate 1700 (in contrast to the switch 1105 mounted to a bottom surface of the substrate 1200). Terminals 1610 of the switch 1605 are received in receiving sockets 1805 of the adapter 1800, and the adapter 1800 is electrically connected to the electrical circuit 1705.

Figure 9:
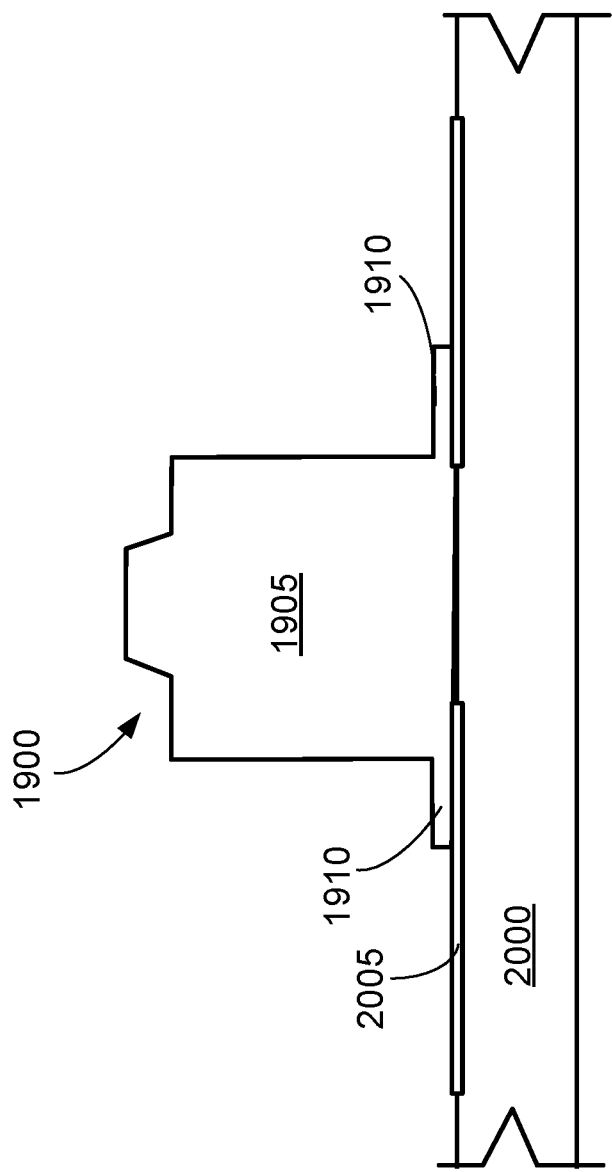
FIG. 9 is a schematic side cross-sectional view of a further example of a key of a keyboard.

FIG. 9 illustrates a schematic cross-sectional side view of a key 1900 mounted to a substrate 2000 (e.g., for the keyboard 100). In the example of FIG. 9, an electrical circuit 2005 of the substrate 2000 is on a top surface of the substrate 2000. A switch 1905 of the key 1600 is surface mounted directly to the substrate 2000. Terminals 1910 extend horizontally from the switch 1605 and extend in a direction parallel to the top surface of the substrate 2000. The terminals 1910 are directly coupled to the electrical circuit 2005.

Figure 10:
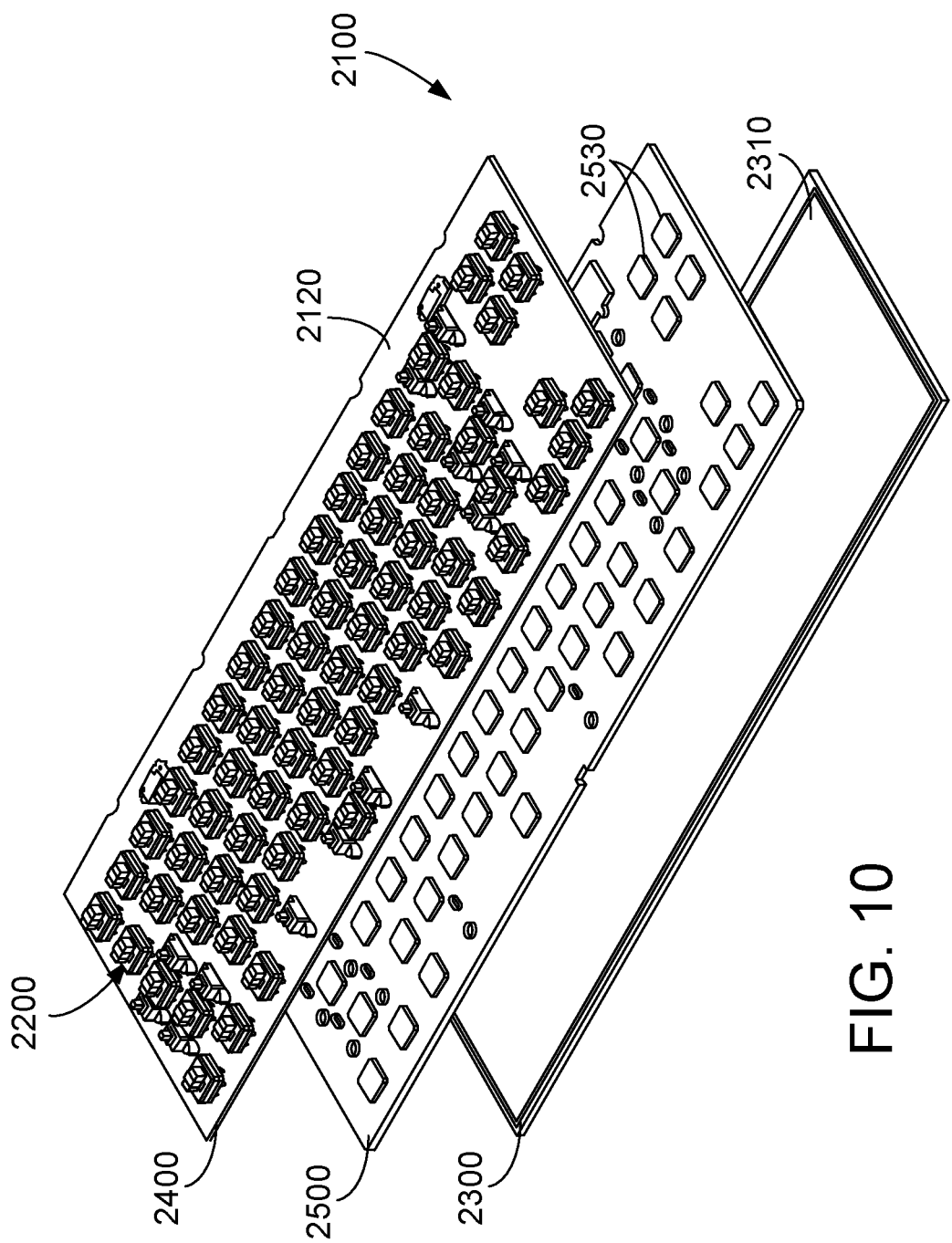
FIG. 10 is an exploded view of another example of a keyboard including a display.

FIG. 10 illustrates another example of a keyboard 2100. Like the keyboard 100, the keyboard 2100 includes a mechanical user input system 2200 and a display 2300 for presenting content through an upper surface 2120 of the keyboard 2100. The content, as described in this disclosure, is presented on a visual side 2310 of the display 2300 such that at least some of the content is visible through the upper surface 2120 of the keyboard 2100. The mechanical user input system 2200 and the display 2300 can include some or all of the features described in connection with the mechanical user input system 200 of the keyboard 100 and the display 300 of the keyboard 100. For example, the mechanical user input system 2200 includes keys 2205, including user-operable portions, such as keycaps (not shown in FIG. 10), and mechanical switches 2215 (which can include features similar to those described with respect to the mechanical switch 215 of the keyboard 100).

Figure 11:
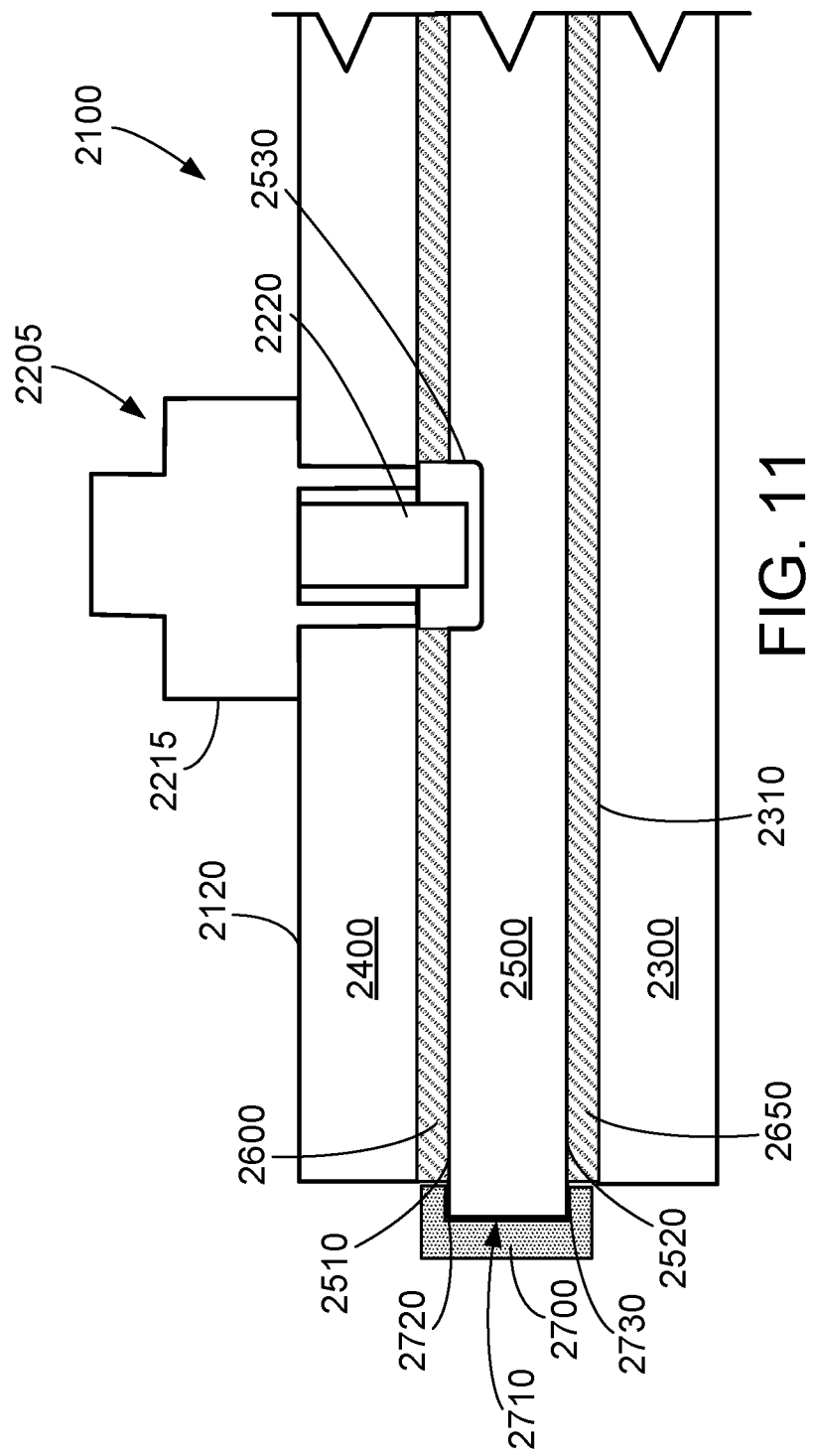
FIG. 11 is a schematic side cross-sectional view of an example of the keyboard of FIG. 10.

And similar to the keys 205, the keys 2205, particularly the mechanical switches 2215, can be mounted to a substrate 2400. The substrate 2400 can include features similar to those described with respect to the substrate 400. For example, the substrate 2400 can include a printed circuit (not shown) electrically coupled to the switches 2215 of the keys 2205 and responsive to keystrokes and operation of the switches 2215 of the keys 2205 to generate signals. In addition, the substrate 2400 can be substantially transparent and can overlay the visual side 2310 of the display 2300. And as shown in FIG. 11, the substrate 2400 is spaced apart from the display 2300. As described with respect to the keyboard 100, the keys 2205 protrude from an upper surface 2120 of the keyboard 2100. The keyboard 2100 can further include a case (not shown) similar to the case 110 described with respect to the keyboard 100. The case, for example, can house the display 2300, the substrate 2400, and a spacer 2500 (described in greater detail below). The upper surface 2120 can correspond to an upper surface of the substrate 2400 (as shown in FIGS. 10 and 11) or an upper surface of the case. Other potential functions and structures of implementations of the keyboard 2100 and its mechanical user input system 2200, display 2300, and substrate 2400 in implementations are described with respect to the keyboard 100 elsewhere in this disclosure.

The keyboard 2100 further includes the spacer 2500 positioned between the display 2300 and the substrate 2400, e.g., positioned in a space extending from the lower surface of the substrate 2400 and the upper surface of the display 2300. The display 2300 can be configured to present the content on the visual side 2310 (e.g., the upper surface) of the display 2300 such that at least some of the content is visible through the spacer 2500 and through the substrate 2400. The spacer 2500 can improve the overall quality of the image that is visible to a user using the keyboard 2100. For example, the spacer 2500 can help reduce optical aberrations caused by projection of the image through the substrate 2400 and out through the upper surface 2120 of the keyboard 2100. The spacer 2500 is, for example, an elongate plate member that is positioned between the display 2300 and the substrate 2400. The spacer 2500 can be substantially rectangular and can have a shape that substantially matches a shape of the display 2300 and/or the substrate 2400.

Referring to FIG. 11, the spacer 2500 includes a first surface 2510 and a second surface 2520. The first and second surfaces 2510, 2520 are upper and lower surfaces, respectively, of the spacer 2500. The first and second surfaces 2510, 2520 are positioned on opposite sides of the spacer 2500. For example, the first surface 2510 faces the substrate 2400, and the second surface 2520 faces the display 2300. The first surface 2510 and the second surface 2520 can be substantially planar.

In the arrangement shown in FIG. 11, the keys 2205 (e.g., the switches 2215) are mounted to a surface of the substrate 2400 that faces away from the spacer 2500. For example, the keys 2205 are mounted to an upper surface of the substrate 2400, and a bottom surface of the substrate 2400 faces the spacer 2500. As described in this disclosure with respect to the substrate 900 and the electrical circuit 910, arrangements of the electrical circuit of the keyboard 2100 relative to the substrate 2400 can vary implementations. For example, the electrical circuit can be a printed circuit and that printed on the bottom surface or the upper surface of the substrate 2400 in implementations.

The spacer 2500 separates the display 2300 from the substrate 2400 by a non-zero distance. For example, a distance between the display 2300 and the substrate 2400 can be between 0.75 millimeters and 10 millimeters (e.g., between 0.75 and 5 millimeters, between 1 and 5 millimeters, between 2 and 5 millimeters, between 3 and 8 millimeters, between 5 and 10 millimeters, etc.). A thickness of the spacer 2500 can be between 0.75 and 5 millimeters (e.g., no more than 1 millimeter, no more than 2 millimeters, no more than 3 millimeters, no more than 4 millimeters, no more than 5 millimeters, between 0.75 and 3 millimeters, between 1 and 5 millimeters, about 1 millimeter, about 2 millimeters, about 3 millimeters, etc.).

The spacer 2500 is substantially transparent such that imagery and content presented by the display 2300 can be projected through the spacer 2500, and then through the substrate 2400, to be visible by the user of the keyboard 2100. The spacer 2500 can be formed a substantially transparent material. In some implementations, the spacer 2500 can be formed of a glass material (e.g., including sapphire glass, crystal glass, tempered glass, or other transparent glass material that can be transparent) or a polymer material (e.g., polycarbonate, acrylic, polyethylene terephthalate, or other appropriate transparent polymer material).

In some implementations, the spacer 2500 includes cavities 2530 (also shown in FIG. 10) that receive at least corresponding portions of the keys 2205. For example, at least some portion of the keys 2205 can protrude through the substrate 2400 and protrude from the bottom surface of the substrate 2400 by a distance. The portions of the keys 2205 that protrude from the bottom surface of the substrate 2400 can be received in the cavities 2530 of the spacer 2500.

The cavities 2530 are recesses that are recessed relative to the first surface 2510. The cavities 2530 have sufficient lateral dimensions (e.g., width and length) to accommodate the widths and lengths of the portions of the keys 2205 that protrude from the bottom surface of the substrate 2400. Depths of the cavities 2530 can further vary in implementations. In some implementations, the cavities 2530 can be between 0.5 and 3 millimeters (e.g., between 0.5 and 1 millimeters, between 0.5 and 2 millimeters, between 0.5 and 2.5 millimeters, between 1 and 3 millimeters, no more than 1 millimeter, no more than 2 millimeters, no more than 3 millimeters, about 1 millimeter, about 2 millimeters, etc.). In some implementations, the cavities 2530 are through holes extending through an entire height of the spacer 2500.

Figure 12:
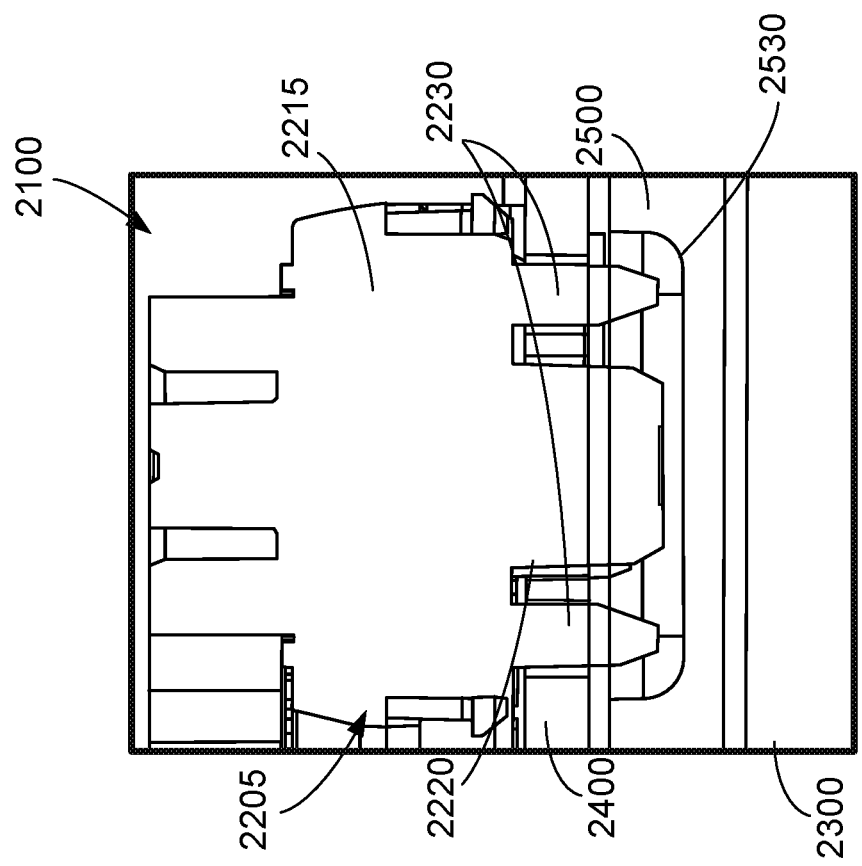
FIGS. 12-13 are schematic side cross-sectional views of a portion of a key received in a spacer of the keyboard of FIG. 10, with FIG. 12 showing the cross-sectional view from a first direction, and FIG. 13 showing the cross-sectional view from a second direction.
Figure 13:
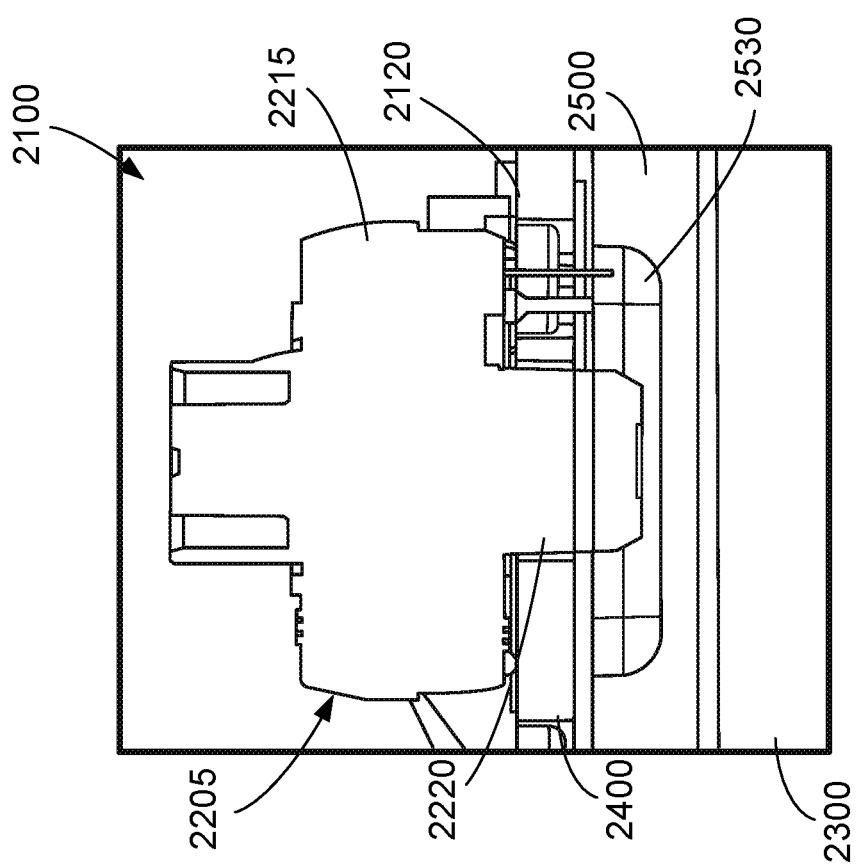

The portions of the keys 2205 that protrude into the cavities 2530 can vary in implementations. As shown in FIGS. 11-12, in some implementations, the keys 2205 include a central post 2220 that can be received in the cavity 2530. The central post 2220 extends through an opening in the substrate 2400 and can be used to mechanically stabilize the keys 2205 (particularly the switches 2215 of the keys 2205) on the substrate 2400. A portion of the central post 2220 can be received in the cavity 2530. As shown in FIG. 13, the keys 2205 can further include lateral posts 2230 positioned on sides of the central post 2220 that can further mechanically stabilize the keys 2205 on the substrate 2400. The lateral posts 2230 protrude through the substrate 2400 and into the cavity 2530. The central post 2220 and the lateral posts 2230 can be formed from a polymer material, such as polycarbonate, acrylic, or other appropriate polymer material.

Referring back to FIG. 11, the display 2300, the substrate 2400, and the spacer 2500 can form a stack that can be placed into the case of the keyboard 2100. This stack can further include adhesives or other attachment mechanism for attaching the display, the substrate 2400, and the spacer 2500 to one another. The stack can thus allow content presented by the visual side 2310 of the display 2300 to be projected through primarily solid material until the projection reaches the upper surface 2120 of the keyboard 2100. In other words, the image is projected through a path between the upper surface 2120 of the keyboard 2100 and the visual side 2310 of the display 2300 that minimizes the amount of intervening air. This can reduce the degree of optical aberrations in the image that is viewed by the user through the upper surface 2120 of the keyboard 2100.

The spacer 2500 can be attached to the substrate 2400 and/or the display 2300. In implementations, the spacer 2500 can be adhered, bonded, or attached in some other appropriate manner to the substrate 2400 and can be separately adhered, bonded, or attached in some other appropriate manner to the display 2300. In the example shown in FIG. 11, the keyboard 2100 includes a first laminate 2600 that attaches the spacer 2500 to the visual side 2310 of the display 2300 and a second laminate 2650 that attaches the spacer 2500 to the substrate 2400. The first laminate 2600, for example, is positioned on the first surface 2510 of the spacer 2500 and is used to bond the spacer 2500 with the substrate 2400. And the second laminate 2650, for example, is positioned on the second surface 2520 of the spacer 2500 and is used to bond the spacer 2500 with the display 2300. In some implementations, the first and second laminates 2600, 2650 extend an entirety of the first surface 2510 and an entirety of the second surface 2520, respectively. The first laminate 2600 can include openings where the cavities 2530 are located, thereby allowing the portions of the keys 2205 to be received in the cavities 2530. The first and second laminates 2600, 2650 can be adhesives that adhere the spacer 2500 to the substrate 2400 and to the display 2300, respectively. In such implementations, the substrate 2400, the laminate 2600, the spacer 2500, and the second laminate 2650 form the stack of solid material through which the display 2300 projects the image through the upper surface 2120 of the keyboard 2100.

As shown in FIG. 11, in some implementations, the keyboard 2100 can further include a gasket 2700 that extends along a perimeter of the keyboard 2100, e.g., an inside portion of the keyboard 2100 and an inside portion of the case of the keyboard 2100. The gasket 2700 can further extend along an outer perimeter of the spacer 2500. The gasket 2700 can be engaged with the case to mount the spacer 2500 to the case. For example, when the display 2300, the substrate 2400, and the spacer 2500 are housed in the case, the gasket 2700 can be used to fix a subassembly, including the spacer 2500, the substrate 2400, and the display 2300, to the case of the keyboard 2100. For example, when the spacer 2500 is attached to the substrate 2400 and the display 2300, the spacer 2500, the substrate 2400, and the display 2300 can form a subassembly insertable into the case of the keyboard 2100. The gasket 2700 can facilitate mounting this subassembly to the case of the keyboard 2100, e.g., via a frictional press fit between the gasket 2700 and an inside portion of the case of the keyboard 2100. The gasket 2700 can be formed of an elastomeric polymer material (e.g., rubber, polyurethane, neoprene, silicone, or other appropriate elastomeric polymer material).

The gasket 2700 can, in some implementations, extend along an entire perimeter of the spacer 2500. The gasket 2700 can accordingly form a loop that is wrapped around the lateral edge of the spacer 2500. For example, in implementations in which the substrate 2400 is substantially rectangular, an outer perimeter can similarly have a substantially rectangular shape.

The gasket 2700 can extend to at least a top of the spacer 2500, e.g., at least to the first surface 2510 of the spacer

2500. The gasket 2700 can further extend to at least a bottom of the spacer 2500, e.g., at least to the second surface 2520 of the spacer 2500. The gasket 2700 can be C-shaped. For example, the gasket 2700 can include an inwardly facing slot 2710 within which the perimeter or the edge of the spacer 2500 is received. In this regard, an upper surface 2720 of the gasket 2700 can be positioned above the first surface 2510 of the spacer 2500, a lower surface 2730 of the gasket 2700 can be positioned below the second surface 2520 of the spacer 2500.

Figure 14:
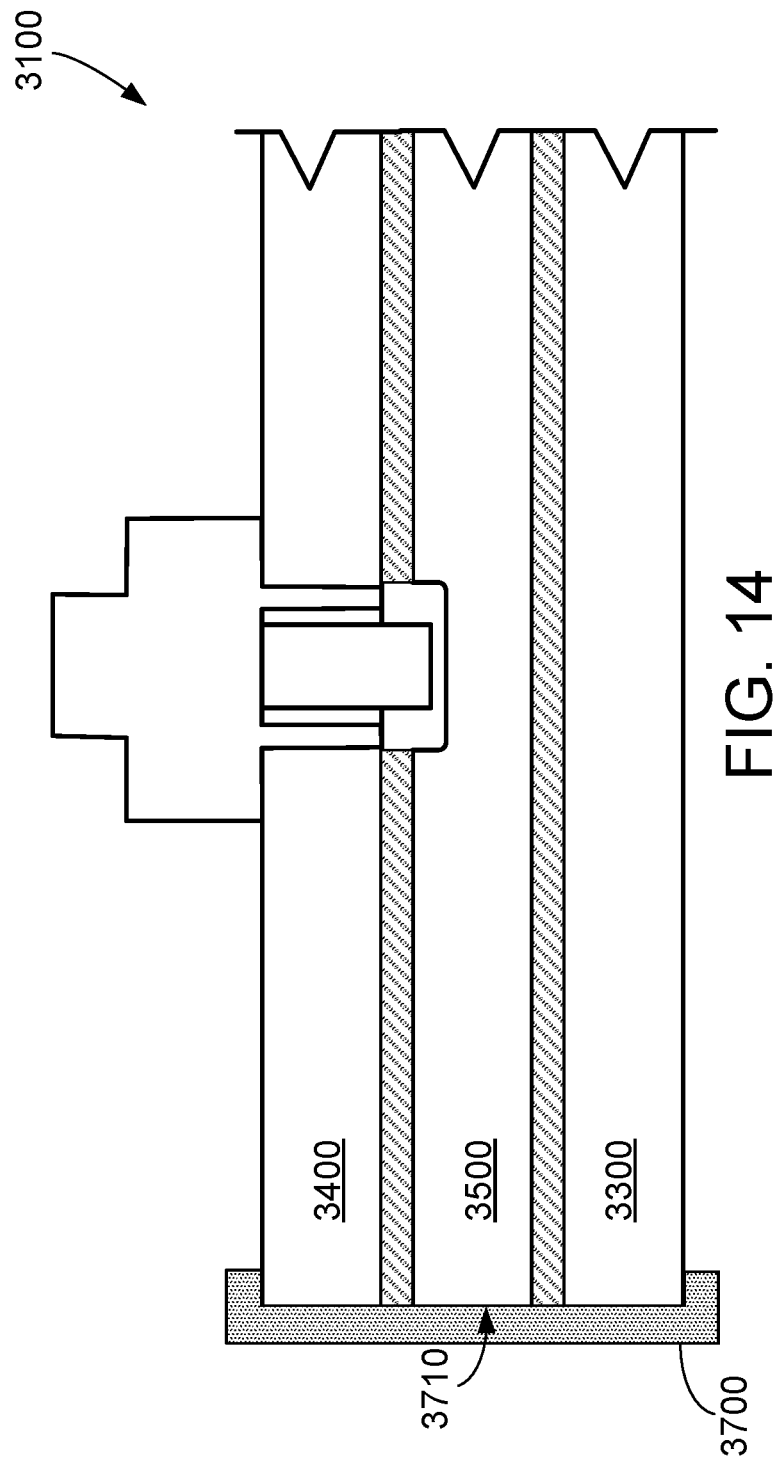
FIG. 14 is a schematic side-cross-sectional view of a further example of a keyboard including a display.

The arrangement of the gasket 2700 relative to the display 2300, the substrate 2400, and the spacer 2500 can vary in implementations. For example, FIG. 14 illustrates another example of a keyboard 3100 in which a gasket 3700 extends to at least a top of the substrate 3400 and a bottom of the display 3300 of the keyboard 3100, and a spacer 3500 can be positioned between the substrate 3400 and the display 3300. The keyboard 3100—and its display 3300, substrate 3400, and spacer 3500—can be identical to the keyboard 2100 except for the arrangement of the gasket 3700 relative to the display 3300, the substrate 3400, and the spacer 3500. The display 3300, the substrate 3400, and the spacer 3500 of the keyboard 3100 can be positioned within a slot 3710 of a gasket 3700. Perimeters of the display 3300, the substrate 3400, and the spacer 3500 are received in the slot 3710 of the gasket 3700. The gasket 3700 can function to hold the stack including the display 3300, the substrate 3400, and the spacer 3500 together.

A number of implementations have been described. While this specification contains many specific implementation details, these should not be construed as limitations on the scope of what is being claimed, which is defined by the claims themselves, but rather as descriptions of features that may be specific to particular implementations of particular inventions. It will be understood that various modifications may be made.

While certain keyboards described in this disclosure are described as being mechanical keyboards that use mechanical switches, in some implementations, the keyboard is a membrane keyboard. The membrane keyboard can include a display similar to the display described in this disclosure. The membrane keyboard can differ from a mechanical keyboard in that the switches of the membrane keyboard include conductive traces on a membrane that is shared between multiple keys, e.g., extends across an area below multiple keycaps of the keys, The subject matter and the actions and operations described in this specification can be implemented in digital electronic circuitry, in tangibly-embodied computer software or firmware, in computer hardware, including the structures disclosed in this specification and their structural equivalents, or in combinations of one or more of them. The subject matter and the actions and operations described in this specification can be implemented as or in one or more computer programs, e.g., one or more modules of computer program instructions, encoded on a computer program carrier, for execution by, or to control the operation of, data processing apparatus. The carrier can be a tangible non-transitory computer storage medium. Alternatively or in addition, the carrier can be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, the subject matter described in this specification can be implemented on one or more computers having, or configured to communicate with, a display device, e.g., a LCD (liquid crystal display) monitor, or a virtual-reality (VR) or augmented-reality (AR) display, for displaying information to the user, and an input device by which the user can provide input to the computer, e.g., a keyboard and a pointing device, e.g., a mouse, a trackball, a touchpad, and examples of the computer mouse 50 described in this disclosure. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Accordingly, other implementations are within the scope of the claims.

What is claimed is:

1. A keyboard comprising:
   a display comprising a visual side configured to present content;
   a transparent substrate overlaying the visual side of the display, the substrate having a printed circuit;
   a transparent spacer positioned between the display and the substrate; and
   keyboard switches mounted to the printed circuit, wherein the spacer comprises a first surface facing the display and a second surface facing the substrate, and wherein the spacer comprises a plurality of cavities into which portions of the keyboard switches protrude.

2. The keyboard of claim 1, further comprising a gasket extending along a perimeter of the spacer.

3. The keyboard of claim 2, wherein the gasket extends along an entire perimeter of the spacer.

4. The keyboard of claim 2, wherein the gasket comprises an inwardly facing slot within which the perimeter of the spacer is received.

5. The keyboard of claim 4, wherein a perimeter of the display is received in the slot of the gasket.

6. The keyboard of claim 4, wherein a perimeter of the substrate is received in the slot of the gasket.

7. The keyboard of claim 2, wherein an outer perimeter of the gasket has a rectangular shape.

8. The keyboard of claim 2, wherein an upper surface of the gasket is positioned above an upper surface of the substrate.

9. The keyboard of claim 2, further comprising:
   an outer case within which the display, the substrate, and the spacer are housed, wherein the gasket is engaged with the outer case.

10. The keyboard of claim 9, wherein a first surface of the spacer is adhered to the substrate, and a second surface of the substrate is adhered to the display, and wherein the gasket is engaged with the outer case to attach the display, the spacer, and the substrate to the outer case.

11. The keyboard of claim 1, wherein the spacer comprises a first surface facing the display and a second surface facing the substrate, and wherein the first and second surfaces are planar.

12. The keyboard of claim 1, wherein a depth of a cavity of the plurality of recesses is between 0.5 and 3 millimeters.

13. The keyboard of claim 1, wherein a cavity of the plurality of cavities is a through opening extending through the spacer.

14. The keyboard of claim 1, wherein the keyboard switches are mounted to a surface of the substrate facing away from the spacer.

15. The keyboard of claim 1, wherein a thickness of the spacer is between 0.75 and 5 millimeters.

16. The keyboard of claim 1, further comprising:
   a first laminate attaching the spacer to the visual side of the display.

17. The keyboard of claim 16, further comprising:
   a second laminate attaching the spacer to the substrate.

18. The keyboard of claim 1, wherein the spacer is formed of a transparent material.

19. The keyboard of claim 1, wherein the keyboard switches are mechanical keyboard switches.

20. The keyboard of claim 1, further comprising keycaps operably engaged with the keyboard switches.

21. The keyboard of claim 1, wherein the display is configured to present the content on the visual side of the display such that at least some of the content is visible through the spacer and through the substrate.

22. The keyboard of claim 1, wherein the transparent substrate has transmittance of at least 50%.

23. The keyboard of claim 1, wherein the transparent spacer has transmittance of at least 50%.

* * * * *